United States Patent [19]

Pennell et al.

[11] 4,052,148

[45] Oct. 4, 1977

[54] INTEGRATED REACTION PROCESS

[75] Inventors: Anthony Robin Pennell, Gravesend; Peter Leslie Dover, Rochester; William Martin Davies, London, all of England

[73] Assignee: The Associated Portland Cement Mfgrs. Ltd., England

[21] Appl. No.: 663,753

[22] Filed: Mar. 4, 1976

[30] Foreign Application Priority Data

Mar. 12, 1975 United Kingdom ............... 10303/75

[51] Int. Cl.² .......................... F24J 1/00; F27B 19/00
[52] U.S. Cl. ........................................ 432/1; 106/100; 432/90; 432/91; 432/106
[58] Field of Search ...................... 432/1, 90, 91, 106, 432/13; 106/100

[56] References Cited

U.S. PATENT DOCUMENTS

| 1,358,759 | 11/1920 | Larsen | 432/90 |
| 1,358,760 | 11/1920 | Larsen | 432/90 |
| 1,596,956 | 8/1926 | Weeks | 432/1 |
| 1,932,467 | 10/1933 | Keenan | 432/90 |

Primary Examiner—John J. Camby
Attorney, Agent, or Firm—Diller, Brown, Ramik & Wight

[57] ABSTRACT

A process in which a substance undergoes endothermic change within a predetermined temperature range in at least one stage of the process and is subsequently subjected to a substantially higher temperature in a further stage of the process, characterised in that effluent heat from said further stage is augmented and the resultant supply of heat is applied partly to the generation of power, and partly to said endothermic change.

17 Claims, 5 Drawing Figures

INTEGRATED REACTION PROCESS

The present invention relates to the heat treatment of substances, especially of solid materials in subdivided form, i.e., particulate, granular, nodular, fluidised or pelletised material or material in lumps or pieces, but also of substances in other states, e.g., molten. More particularly the invention concerns the type of process in which such a substance undergoes endothermic change in one stage and is subsequently subjected to a substantially higher temperature in a further stage of the process. The invention is applicable with particular advantage to processes in which the further stage involves an exothermic reaction at a relatively high final temperature.

There are many processes in which a solid raw material, usually in particulate, granular or nodular form, requires to be reacted or otherwise treated at elevated temperature and where a significant amount of the heat applied for this purpose subsequently leaves the reaction zone in the form of hot gas representing a potential waste, which is by no means fully accounted for even when further applied to the preheating of the solid raw materials. Processes of this type which are of particular interest in relation to the present invention are those in which a reaction to be carried out is endothermic and calls for the investment of a considerably quantity of heat, with a correspondingly appreciable liability to heat loss, especially if the solids reacted in the endothermic stage are then to be further reacted at a substantially higher temperature under conditions of heating not readily compatible with those of the endothermic stage.

A typical process of this type is the production of Portland cement clinker from prepared raw materials, in the continuous manufacture of Portland cement. Although a process of this type can be regarded as comprising more than one stage such as drying, dissociation and combination, at least the last two of these stages are typically carried out in a single reaction chamber, such as a rotary kiln fired at one end by flame fed with gas, oil or pulverised coal, to provide all the heat for every stage. Each stage after the first has to be supplied with enough heat to meet the requirements of preceding stages. In practice there is a residue of effluent waste heat from the first stage, but a more serious waste of energy arises when the final heating stage is exothermic, because of the disparity between the temperature at which the heat is developed in the exothermic stage and the lower temperature at which the major part of that heat is required in preceding stages.

In the case of Portland cement clinker production, for instance, one and the same kiln provides the reaction space not only for decarbonation of the calcareous component of the raw material, but also the reaction space for the sintering and further reaction of the decarbonated solids at a much higher temperature towards the fired end of the kiln. In the wet process the same kiln also has to accommodate an initial drying stage before decarbonation. In the dry process, one of several methods is generally employed to prepare the starting materials in a dry state by means of a preheater stage, where the raw material is dried and possibly partly calcined or decarbonated, before entry into the kiln, for instance by means of a heated travelling grate, a preliminary kiln, a gas suspension preheater or spray-drier preheater.

Conventional processes of this type are thermally inefficient for many reasons, prominent among which, as already indicated, is the loss of heat in the exhaust gases from the process, in spite of the prevailing use of exhaust gases from the kiln to furnish the heat for the drying or preheating stage mentioned above. Indeed in some cases still further heat is supplied from an auxiliary source such as a burner, to a preheater in such a process.

Many attempts have been made hitherto to recover heat from exhaust gases in this type of process but all are limited by virtue of the relatively low temperature of the exhaust gases.

As already indicated by way of example, the cement burning process can be regarded as consisting of three distinct stages, i.e., drying and preheating (whether in a separate chamber or not), decarbonating, and high temperature sintering. Each of these stages requires a different quantity of heat in relation to the solids throughput, at a different temperature, from that in the other stages. The sintering zone requires a high temperature, typically about 1,450° C, but relatively little heat, the reactions involved being exothermic; the decarbonating zone requires the greatest quantity of heat, the reaction being endothermic, but at a lower temperature, about 950° C; the drying or preheating stage requires an amount of heat which varies according to the moisture content of the raw material and other mainly physical factors, but at a relatively lower temperature still.

It is known in this type of process to introduce heat into a preheater stage involving some calcination, by means of an auxiliary source of heat such as an auxiliary furnace, while at the same time reducing the relative fuel requirement in the sintering stage. Improved kiln economy or throughput can be obtained in such a manner but the previously mentioned excessive disparity between the temperatures of successive stages still remains and there is an inevitable waste of energy incurred in the conveyance of heat without useful work from a hot to a less hot zone; the heat is degraded.

It is an object of the invention to exploit the essential thermal disparity of such a process by usefully extracting excess heat from the process at an intermediate stage where the temperature of the gases is high in relation to the demands of the succeeding stage in the gas path (the previous stage in terms of solids treatment), and where advantage can be taken of the high gas temperature.

It is a more general object of the invention to distribute heat to individual stages, in a process in which a substance is treated at successively increasing temperatures, in amounts more closely approaching the actual heat requirement in each respective stage, and to apply the resultant unconsumed heat to the generation of power.

According to the invention we provide a process in which a substance undergoes endothermic change within a predetermined temperature range in at least one stage of the process and is subsequently subjected to a substantially higher temperature in a further stage of the process, characterised in that effluent heat from said further stage is augmented and the resultant supply of heat is applied partly to the generation of power, and partly to said endothermic change.

By a substantially higher temperature we mean that the temperature gradient is sufficient to permit the generation of power although the actual quantity of heat which can be derived may need augmenting before power generation is justified. By augmenting we mean adding further heat energy.

Generally the generated power is electrical power, generated in known manner by a turbine driven by steam raised in a boiler by means of the applied heat.

According to preferred embodiments of the invention the process is a continuous process of Portland cement manufacture and the substance under treatment is the raw material for producing Portland cement clinker. The further stage referred to herein may accordingly be exothermic, exemplified by the exothermic stage of clinker formation, i.e., combination, in a rotary kiln. The endothermic change may include calcination or decarbonation, i.e., dissociation, and it may include drying, as in a preheater, slurry spray drier or heated mill, or mere change of temperature as in a slurry heater.

The heat supplied to augment the effluent heat from the further stage referred to herein may be obtained and supplied in any suitable manner, for instance in the form of fuel for burning in a boiler or in a reaction zone such as a calciner, or in the form of hot combustion gases from a fuel burner, especially a fluidised bed combustor, or in the form of surplus, unconsumed or recuperated heat from another stage in the process, generally conveyed by fluid such as gas or water.

The invention facilitates the adoption of relatively low grade fuels or even waste materials such as refuse, for supplying heat for use in producing endothermic change, instead of having to rely on excess heat from an exothermic stage for which a high grade and more costly fuel is necessary. The various means used for imparting heat may be chosen and distributed individually to the respective stages of a process and the amount of heat supplied to the further stage referred to can be substantially no more than is required to support exothermic acitivity. In various embodiments of the invention the fuel supplied to the exothermic stage represents from 5 to 25 per cent by weight of the total fuel requirement of the process.

The principle of the invention can be embodied in a variety of ways and may be employed more than once in the same process flow scheme, as illustrated further hereinafter with reference to the drawings. For instance a boiler for power take-off may be supplied with fuel and with gas heated by contact in a cooler with the product of the further stage referred to (cf. FIG. 1). The cooler may be that into which hot clinker is discharged from a rotary kiln. The resultant residue of heat not supplied to or consumed in the boiler is then passed to an endothermic stage such as dissociation, e.g., decarbonation in a calciner or preheater in advance of the rotary kiln.

Figure 2:
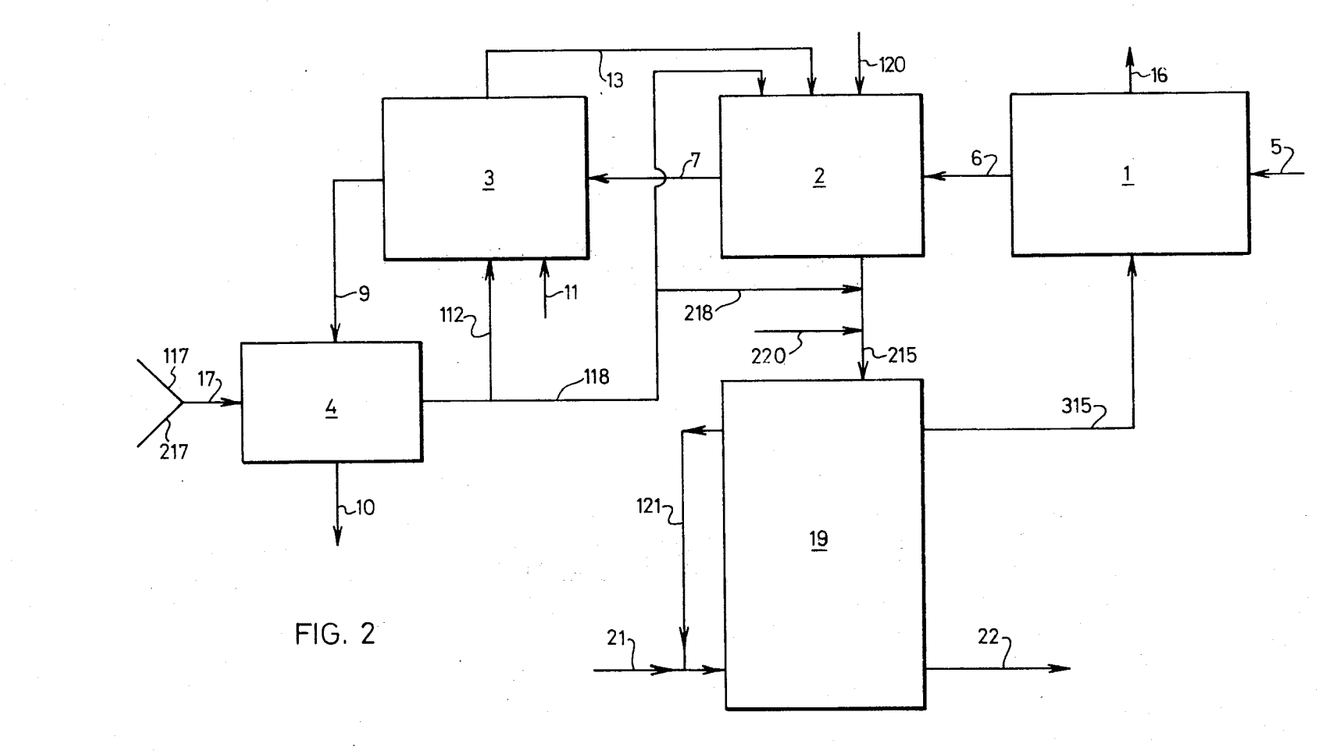
FIG. 2 is a diagrammatic flow sheet for a process embodying the invention in which steam generation is arranged between decarbonation and drying in cement clinker production.

In another example which may be adopted with or without the example just given, a process stage involving dissociation is supplied with fuel and with gas heated by contact in a cooler with the product of the further stage, and a boiler is supplied with fuel and with heated gas from the process stage involving dissociation (cf. FIG. 2). In this case the resultant residue of heat not supplied to or consumed in the boiler may then pass to an endothermic stage including precalcining or drying or both.

Figure 3:
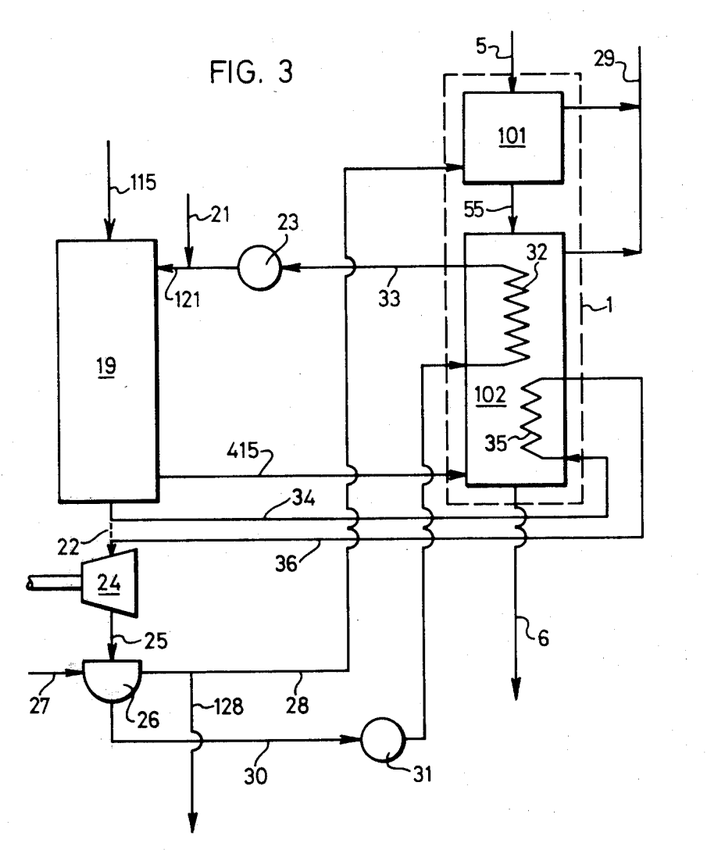
FIG. 3 is a diagrammatic flow sheet for part of a process in which steam generation is arranged in relation to preheating stages of the process.

In another example a boiler is supplied with heated gas from the further stage, which in this case may be a clinkering kiln or a decarbonator, and with heated recycle water from an economiser located in a preheater stage involving endothermic change, such as a precalciner (cf. FIG. 3). The same process can exemplify the principle of the invention again, in that the boiler is supplied with recycle water from the preheater stage already mentioned, and with heat from one or more subsequent stages of the process, and residual heat is employed in a preliminary stage such as the first section of a preheater in the form of air heated by boiler condensate. The fluid heat transfer medium used to accept heat from the condensing steam may advantageously be air or other fluid, employed to transfer the heat to solids to be preheated, for instance as a drying agency. Water may be used as heat transfer medium and may be employed to serve an external demand such as district heating.

In the foregoing manner or otherwise the steps of the process of the invention may be repeated, employing a plurality of stages involving endothermic changes, and one common boiler.

Air which is to be supplied in the process, for heat exchange, as in a clinker cooler or raw material drier, or for combustion as in a rotary kiln, calciner or boiler burner, may, if desired, be preheated by heat exchange with fluid turbine effluent, i.e., water or steam. Air used for combustion may if desired be oxygen-enriched, e.g., in the kiln, where this will not interfere with the process.

Advantages of operation according to the invention, in addition to the fulfilment of the above-mentioned objects, include the following. Each stage in the process can be conducted in separate equipment specifically designed and tailored for that stage, with a consequent increase in efficiency and reduction in capital outlay; the equipment can nevertheless be existing equipment, utilised more fully. The whole process is capable of a much greater degree of control than hitherto, leading to improved and more consistent product quality, from a wider range of feed material; the process is at once more stable and yet more flexible. Power extracted from the process, most conveniently the raising of steam coupled with means for generating electricity will lessen the dependence of the process plant on external electricity supply, and may permit electrical power to be used in the attainment of processing temperature.

The invention will now be further described by way of example with reference to the accompanying drawings in which.

Figure 1:
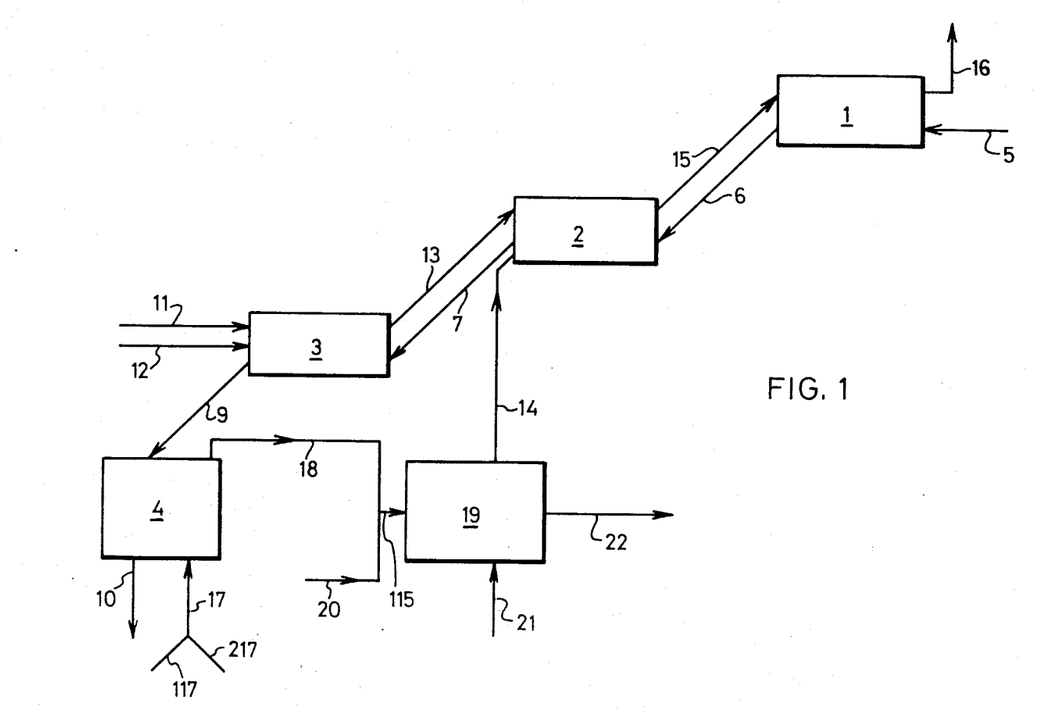
FIG. 1 is a diagrammatic flow sheet for a process embodying the invention in which steam generation is arranged between sintering and decarbonation stages in cement clinker production.

FIG. 1 shows a basic scheme for extracting heat for power generation between the sintering and decarbonating stages of a Portland cement clinker production process. In this scheme the three main stages in the treatment of the raw materials initially in the form of slurry or moist nodules or granules, occur in sequence in three zones, namely drying and preheating, decarbonating, and high temperature sintering zones 1, 2 and 3 respectively. Some decarbonating may occur in the preheating zone, which may take any convenient form and may be in the same chamber or group of communicating chambers as the decarbonating zone. The decarbonating zone 2 and the sintering zone 3 however, constitute distinct chambers. Thus zones 1 and 2 may, for instance, comprise a travelling grate or gas suspension preheater whereas zone 3 is a rotary kiln. A fourth stage, of cooling, occurs in cooling zone 4.

Raw materials for cement clinker production are fed from a supply 5 through preheater zone 1 where they are dried or dehydrated and preheated by heat exchange with hot gas at, say 150° C to 600° C in known manner. The preheated solids are fed, for example, by gravity or by conveyor 6, to and through the decarbonating zone 2 where further heat exchange with gas occurs and carbon dioxide is evolved, at a temperature higher than that in preheating zone 1, say 900° C to 1100° C. The decarbonated solid product is transferred, generally by downcomer 7 under gravity, into sintering zone 3, e.g., a rotary kiln through which the solids advance and which is fuel fired to maintain a final temperature of about 1500° C whereby the solids are sintered and react to form clinker. The hot clinker is discharged at about 1400° C by descent 9 under gravity to cooler 4, and through the cooler to the product outlet 10 from the process.

Fuel (gas, oil or pulverised coal) from a supply 11, representing for example about 10 per cent by weight of the total fuel requirement of the process, is injected with air from supply 12 into sintering zone 3 (but not necessarily at the end as illustrated) and suffices to maintain the net exothermic clinkering reactions in that zone. Since such a low proportion of the fuel is required at this stage, the specific output in terms of kiln size will be considerably greater than is conventional. This effect may be further enhanced by using oxygen-enriched air from supply 12 to raise the flame temperature and to reduce the waste gas volume. Electric furnace means may also be adopted to produce the high temperature required.

Hot combustion gas is exhausted from sintering zone 3 into decarbonating zone 2 by way of duct 13 (which may be a riser pipe also embodying downcomer 7) where it supplements the main heat supply entering via duct 14, referred to later. Exhaust gas, including evolved carbon dioxide, is withdrawn through passage 15, preheater zone 1 and exhaust vent 16 in conventional manner, e.g., by means of one or more electrically driven fans.

Atmospheric air drawn in at 117, or air heated by heat exchange with condensed steam (see line 128, FIG. 3) and supplied to line 217, enters by line 17 into the cooler 4 and reaches a temperature of the order of 1000° C and is passed, not as hitherto conventional into the kiln, but through ducts 18, 115 to a steam generator 19, where it is used to support the combustion of the remaining 90 per cent by weight of the total process fuel requirement, supplied through 20 and 115 to the boiler or steam generator 19. In the steam generator 19 water supplied by line 21 is converted to steam delivered at outlet 22 at a temperature suitable for power generation. Exhaust combustion gases from steam generator 19 leave by duct or flue 14 to be supplied at about 1000° C to the decarbonating zone 2 where they provide the main supply of the relatively large proportion of the total process heat required for decarbonation and, through duct 15, for drying. Dehydration of clay also occurs in these zones but does not call for such considerable proportions of heat.

The power generated from the steam supplied by line 22 can, of course, be employed in ancillary plant such as grinding mills for raw material, fans, rotary drives and for heating.

Waste heat boilers for recuperating heat from rotary cement kilns are, of course, known, but they drew their heat from the back end of the kiln while all the fuel was applied to the front end, whereas in the present invention not only is the fuel supply apportioned to its several tasks but the heat for power generation is extracted at the most advantageous point or points. Thus whereas in the embodiment just described with reference to FIG. 1 the heat is diverted between the sintering and decarbonation zones, in the embodiment about to be described with reference to FIG. 2 the heat for power purposes is tapped off after the decarbonation stage in the direction of heat flow.

In the embodiment of FIG. 2, the clinker production process is again conducted in three successive stages respectively in drying and preheating zone 1, decarbonating zone 2 and sintering zone 3, followed by cooler 4. In this embodiment also, the preheating and decarbonating zones may be associated in one chamber as long as they are efficiently compartmented in respect of gas flow.

Referring to FIG. 2, raw materials for cement clinker production are fed from supply 5, at ambient or storage temperature of say 25° C, through preheater zone 1 where they are dried and preheated by heat exchange with hot gas at, say 150° C to 600° C in known manner. The preheated solids are fed, as already described in relation to FIG. 1, by conveying means 6 and through decarbonating zone 2 which they enter at, say 500° C. Here further heat exchange with hot gas occurs and carbon dioxide is evolved, the hot gas being supplied as described below, at a temperature higher than that in the preheating zone 1, say 900° C to 1100° C. The decarbonated solid product is transferred as previously noted, by conduit 7 at about 1100° C into sintering zone 3, i.e., a rotary kiln through which the solids advance and which is fuel fired to maintain a final temperature of about 1500° C, whereby the solids are sintered and react to form clinker. The hot clinker is discharged to cooler 4 and through the cooler to the product outlet 10 at about 100°.

In a practical example, for every kilogram of product at outlet 10, some 1.65 kg of raw material at 3 per cent moisture content is required at the feed 5, from which nearly 0.05 kg water are evaporated and 0.5 to 0.6 kg carbon dioxide are removed, in zones 1 and 2.

Fuel, as in the embodiment of FIG. 1, from a supply 11, but representing as little as about 6 per cent by weight of the total fuel requirement of the process, is injected with air from supply 112 or with oxygen-enriched air, into sintering zone 3 and suffices to maintain the net exothermic clinkering reactions in that zone.

Some hot combustion gas at about 1500° C is exhausted from sintering zone 3 into decarbonating zone 2 by way of duct 13, where it supplements the main heat supply in that zone.

Atmospheric air drawn in at 117, or air heated by heat exchange with condensed steam (see line 128, FIG. 3) and supplied to line 217, enters by line 17 into the cooler 4 and reaches a temperature of the order of 1100° C and is passed through duct 118 to decarbonating zone 2 where it combines in the heating function in that zone, supporting the combustion of up to 79 per cent of the total process requirement of fuel fed in by line 120, for instance to a suitable burner ancillary to zone 2, to furnish the relatively large proportion of the total process heat required for decarbonation, and, as described further, for drying.

The exhaust gas from the decarbonating zone is withdrawn by duct or flue 215 at about 1100° C, joined by the remaining 15 per cent of the process fuel from line 220 and heated air from line 218, to furnish with further combustion the heat to raise steam in steam generator 19 and the hot gas through line 315 at 600° C to 700° C for the preheater and drier. The waste gas from preheating zone 1 leaves by exhaust vent 16 at about 50° C to 100° C.

In the steam generator 19, water supplied by line 21 or condensate recycle line 121 is converted to steam delviered at outlet 22 at a temperature of about 400° C suitable for power generation.

For the drying, preheating and decarbonating stages it is desirable to employ countercurrent heat exchange structures to effect heat recovery from waste gases. However, some conventional cement manufacturing processes use cross-flow gas-solid contacting devices which are thermally inefficient. A particularly advantageous manner of linking a preheating zone cross-flow heat exchanger with part of the steam cycle, is illustrated in FIG. 3.

In this FIGURE there is illustrated a preheating zone 1, such as a travelling grate preheater, forming part of a process for treating solid raw materials, such as those for the manufacture of Portland cement clinker, in which process the preheated raw materials undergo further heat treatment in a subsequent zone or zones, not shown, and exhaust gases are withdrawn from such subsequent zone or zones at a temperature and in an amount suitable to provide for raising steam for power generation as well as for supplying heat to the preheating zone 1. The preheating zone is considered as having a drying section 101 fed by solid raw materials at ambient temperature, say 25° C, by line 5, and a further preheater section 102, fed by the dried raw materials at 100° C by line 55.

This FIGURE also shows a steam boiler 19 for raising steam by means of heat supplied in the form of hot gases through duct 115 at about 1100° C, from the abovementioned subsequent zone or zones such as the decarbonating zone and/or the sintering zone of a cement clinker production process. The hot gases after use in steam raising are supplied through duct or flue 415 at 700° C to 900° C or more to the preheating zone 1 as shown or via an aforesaid subsequent zone, such as a decarbonator between the heat supply zone connected to duct 115 and the preheater. The preheater solids are indicated as passing by means 6 to a subsequent zone such as a decarbonator.

Feed water is supplied to the boiler by line 21, or as recycled condensate pumped via line 121 by high pressure pump 23. Steam developed in the boiler is fed by line 22 to an electric generator 24 and passes on by line 25 to an air condenser 26 operating at atmospheric pressure. Alternatively the steam for supply to generator 24 may be superheated, by passage through line 34, heat exchanger 35 mounted in hot preheater gases, and return line 36, before reaching generator 24 and condenser 26. Air supplied in line 27 to condenser 26 is fed through duct 28, to provide the heat for dyring in drier 101 before passing at about 50° C to the exhaust stack at 29. Air in duct 28 may also be taken by line 128 for other uses, such as clinker cooling, in the associated process plant.

The steam condensate is taken from the condenser by line 30 by means of low pressure pump 31 and delivered through economiser 32, mounted to withdraw heat from the flue gases of preheating section 102, and along line 33 to pump 23 for return as preheated boiler feed water, while the flue gases are sent to the stack 29 at about 50° C.

In this manner the waste heat which would otherwise ultimately be lost up the stack is recovered in the steam power cycle and the whole process rendered more thermally efficient.

In an alternative embodiment the condenser 26 may be a water condenser operating under subatmospheric pressure and providing heat at a moderate temperature for external use as in district heating.

Figure 4:
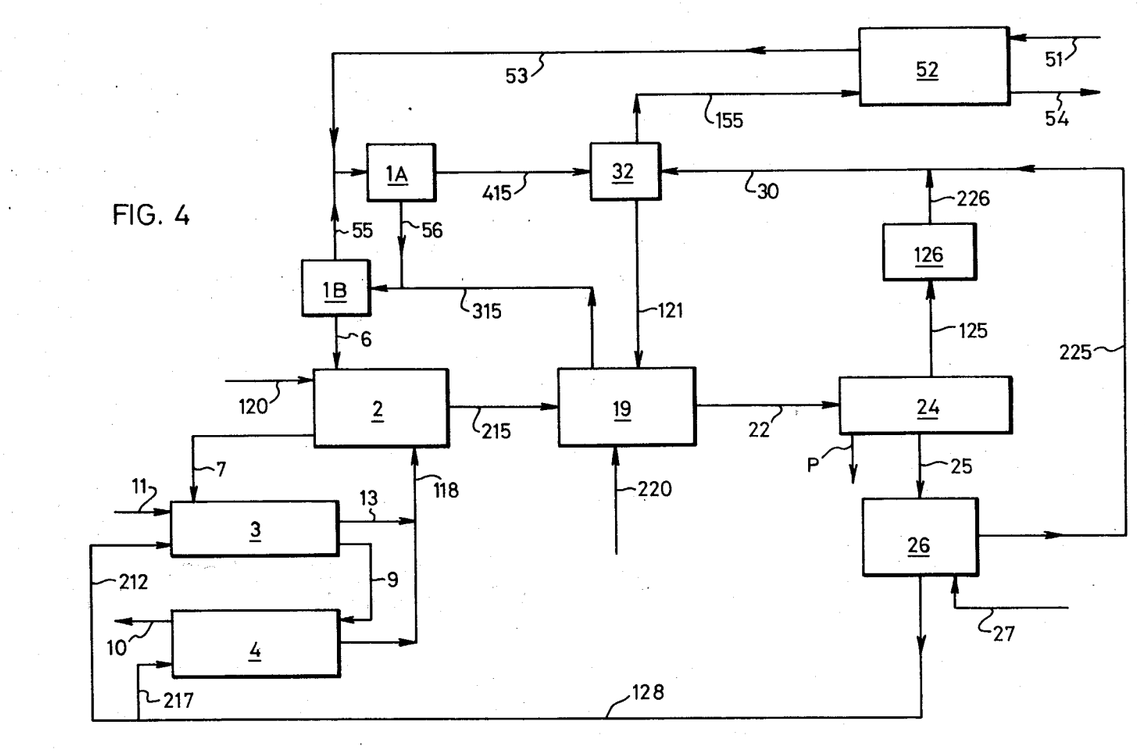
FIG. 4 is a diagrammatic flow sheet for a process embodying the invention more than once in a dry process of cement manufacture.

Referring to FIG. 4, and expressing material quantities in terms of weight per kilogram of clinker produced, moist raw material for Portland cement is supplied at 51, comprising 1.51 Kg solids and 0.08 Kg water at 20° C, to a raw mill 52 supplied with heated gas, as explained later. The 1.51 Kg of milled product leaves the mill by conveyor 53 while 2.32 Kg of exhaust gas and evaporated water at 80° C are sent to dust collecting precipitators and the exhaust stack not shown.

The milled material from conveyor 53 enters as two-stage preheater 1A, 1B, e.g., a gas suspension preheater column or compartmented travelling grate, passing from the first stage 1A by conduit 56 to stage 1B while hot gas at about 750° C passes through the preheater system by means of conduit 55, having entered at 800° C. from conduit 315.

The solids, preheated to 700° C, pass by conduit 6 to a calciner 2 for completion of dissociation reactions commenced in pre-heater Section 1B. From the calciner 2, 1.0 Kg calcined product at 900° C is fed at 7 to rotary kiln 3, the gaseous dissociation product, mainly $CO_2$, leaving with other gas at 900° C by conduit 215. The calciner 2 is supplied with 0.33 Kg hot gaseous combustion product in line 13 at 1500° C from kiln 3, joined by air heated in the cooler 4 to make up 1.17 Kg gas at 980° C in line 118 and with 0.078 Kg fuel at 120 for combustion in the calciner.

From kiln 3 the 1.0 Kg clinker product at 1250° C goes to the rotary cooler 4 by way of conduit 9, through the cooler to the output 10 at 170° C.

Air 27 supplied at 20° C is heated to 150° C in a heater 26 by heat exchange with turbine recycle water referred to later, and 1.41 Kg of this air is then supplied through lines 128 and 217 to the rotary cooler 4 and a further 0.3 Kg through line 212 of the kiln 3 for supporting the combustion of 0.03 Kg fuel supplied to the kiln at 11.

The calciner 2 thus receives effluent unconsumed heat from the kiln 3, by virtue of gaseous combustion product through 13 and via the cooler 4 and line 118, as well as fuel by supply line 120. The heat thus augmented is applied partly to the endothermic changes of calcination, and partly to power generation. This latter is achieved by passing the 2.24 Kg hot gaseous effluent at 900° C from the calciner by conduit 215 to boiler 19 where is contributes to steam-raising for power.

Boiler 19 operating at 900 p.s.i. receives heat in the form of the hot gas supplied by conduit 215, and in the form of 0.25 Kg fuel by line 220 for combustion in the boiler. The feed water supplied to the boiler by line 121 is also preheated as explained later. The heat thus augmented for the boiler is applied partly to steam-raising for power and partly to the endothermic changes achieved in the preheater 1A, 1B, by virtue of the conduction of the 2.24 Kg gas at the lower temperature of 800° C. to preheater section 1B and thence through conduit 55 at 750° C to preheater section 1A.

Preheater 1A, 1B, delivers effluent unconsumed heat in the form of the 2.24 kg of gas now at 450° C in line 415 to economiser 32 where it imparts heat to 0.49 Kg of boiler water at 70° C in line 30 recycled at a resultant temperature of 277° C to boiler 19 by feed line 121. The effluent heat thus augmented in the economiser is in this manner partly applied to steam-raising, and the residue is applied by way of line 155 in the form of the 2.24 Kg of gas now at 210° C, to heating the raw mill 52.

The boiler 19 delivers 0.49 Kg steam at 426° C through pipe 22 to a turbine 24 which drives an electric generator (not shown) to produce a power output P. The aqueous fluid effluent from the turbine comprises 0.38 Kg water at 50° C which is recycled by line 125, through condenser 126 and lines 226 and 30 to the economiser as already mentioned; and 0.11 Kg steam and water at 150° C discharged by conduit 25 to the air heater 26. The condenser heats 6.3 Kg cooling water to 50° C. The fluid in line 25 is recycled at 150° C through the air heater and lines 225 and 30.

An equivalent conventional dry process in a typical works would be expected to require 1262 Kcal/Kg clinker, of primary energy, i.e., 962 Kcal/Kg as high grade fuel and 100 KWh/t power, whereas the process just described would require only 905 Kcal/Kg energy, in the form of only 200 Kcal/Kg as high grade fuel, and at the most 705 Kcal/Kg as low grade fuel, while yielding 100 KWh/t electric power output. Large or total reductions are thus obtained in waste gas loss, cooler exhaust loss and shell losses, with significant reduction in dust loss, at the expense of some loss at the condenser.

Figure 5:
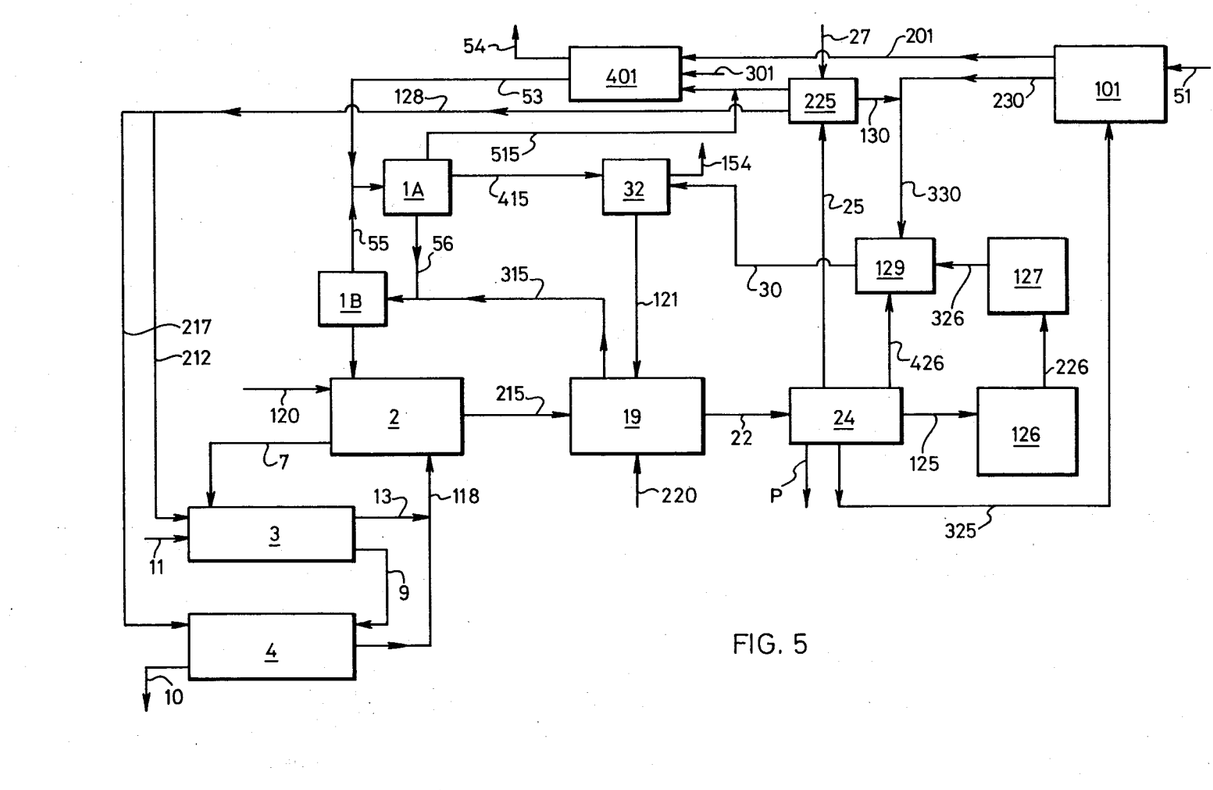
FIG. 5 is a diagrammatic flow sheet for a process embodying the invention more than once in a (semi-) wet process of cement manufacture.

Referring now to FIG. 5 there is represented a process a major part of which is exactly similar to that in FIG. 4, namely the preheater 1A, 1B, the calciner 2, the kiln 3, the cooler 4, the boiler 19, the economiser 32, the turbine 24, and their interconnections and relationships and the flow of materials therethrough, except as noted in the following.

Again expressing material quantities in terms of 1.0 Kg clinker output, 2.16 Kg cement slurry are supplied at 51 to a slurry preheater 101 heated by turbine effluent as described later. The slurry, heated to 150° C, is fed by conveyor 201 to spray-drier 401 from which 1.51 Kg resulting spray-dried solids at 100° C are conveyed to the preheater by conveyor 53.

The hot gas effluent from the preheater is divided between 1.12 Kg at 450° C by line 415 to the economiser, and 1.12 Kg at 450° C to the spray-drier 401 by line 515.

The fuel supply 220 to boiler 19 is 0.038 Kg and the boiler steam output 22 to the turbine 24 is 0.705 Kg at 426° C. The aqueous fluid effluent from the turbine is employed in four directions, i.e., 0.13 Kg steam at 150° C by line 25 to an air heater 225, 0.245 Kg steam at 150° C by line 325 to the slurry preheater 101, 0.25 Kg steam at 150° C by line 125 to a condenser 126 and recycle at 50° C by way of line 226, air ejectors and units 127 and line 326; and 0.08 Kg steam at 150° C by line 426 to deaerator and tank 129. The recycle water is also taken at 150° C from the air heater by lines 130 and 330 and from the slurry preheater at 150° C by lines 230 and 330 to the de-aerator and tank. The recycle water collected in the tank 129 is returned by line 30 to the economiser.

Of 2.01 Kg air at 20° C supplied at 27 to air heater 225, 0.3 Kg passes directly to the spray drier 401 for combustion of 0.03 Kg fuel supplied at 301, and 1.71 Kg air heated in heater 225 to 150° C is divided between 0.3 Kg combustion air to kiln 3 and 1.41 Kg cooling air to cooler 4, by lines 128, 212 and 128, 217 respectively.

From the spray drier 401, 2.07 Kg gaseous effluent and vapour at 110° C are released to the stack at 54; and 1.12 Kg gaseous effluent is sent to the stack at 150° C from the economiser at 154.

An equivalent conventional wet process in a typical works would be expected to require 1917 Kcal/Kg clinker, of primary energy, i.e., 1457 Kcal/Kg as high grade fuel, 160 Kcal/Kg as low grade fuel, and 100 KWh/t power, whereas the process just described would require only 1196 Kcal/Kg energy, in the form of only 200 Kcal/Kg as high grade fuel, and at the most 996 Kcal/Kg low grade fuel, while yielding 100 KWh/t electric power output. Large or total reductions are thus obtained in respect of evaporation, waste gas losses, shell losses and dust losses, with significant reduction in cooler exhaust loss, at the expense of some loss at the condenser.

In relation to the quantities quoted in respect of FIGS. 4 and 5, it is assumed that the fuel supplied has a calorific value of 7000 Kcal/Kg gross (or 6500 Kcal/Kg net).

The methods described broadly herein can be readily applied to other processes than cement manufacture, such as the burning of line or dolomite, or in other industries.

What we claim is:

1. A thermal calcination process comprising the steps of:
    a. passing raw material through at least one heating zone wherein heat energy is applied to produce endothermic change in the material;
    b. passing the hot material treated in step (a) into a reaction zone wherein further heat energy is separately applied to produce exothermic change in the material;
    c. passing the still hotter material treated in step (b) through a cooling zone and recovering a cooled reaction product therefrom;
    d. supplying to said reaction zone a first source of heat energy in sufficient quantity and at a sufficiently high temperature to support said exothermic change; the said endothermic change of step (a) being all dependent upon at least one source of heat energy other than said first source;
    e. supplying a second source of heat energy to a boiler and applying said heat energy for raising steam and thereafter for producing at least part of the endothermic change in said material in step (a);
    f. augmenting said second source of heat energy by adding thereto heat recovered from at least one process zone including heat derived from the reaction zone; and
    g. employing steam raised in the boiler for the generation of power.

2. A process according to claim 1 further comprising:
    h. performing said endothermic change of step (a) in a first heating zone of step (a);
    i. supplying a third source of heat energy to a second heating zone of step (a) for completing the said endothermic change;

j. obtaining said heat recovered in step (f) from said second zone.

3. A process according to claim 2 wherein said process is a continuous process of Portland cement manufacture and said reaction zone is in a rotary kiln.

4. A process according to claim 1 wherein the heat energy provided in step (d) is not substantially more than is required to support the exothermic reaction.

5. A process according to claim 2 wherein the heat energy provided in step (d) is not substantially more than is required to support the exothermic reaction.

6. A process according to claim 2 wherein the heat derived from the processing zone in step (f) is obtained from the cooling zone.

7. A process according to claim 6, wherein the endothermic change in the second zone in step (i) involves dissociation and said heat obtained from the cooling zone is applied to said second zone.

8. A process according to claim 2 wherein the endothermic change in the first heating zone includes drying.

9. A process according to claim 2 wherein said boiler additionally receives heated recycle water from an economizer located in a heating zone of step (a).

10. A process according to claim 3 wherein air for heat exchange and to support combustion in process zones is preheated by heat exchange with fluid turbine effluent.

11. A process according to claim 1 wherein combustion air supplied to said reaction zone is oxygen-enriched.

12. A process according to claim 1 wherein the fuel supplied to said reaction zone represents 5 to 25 per cent by weight of the total fuel requirement of the process.

13. A process according to claim 2 wherein the fuel supplied to said reaction zone represents 5 to 25 per cent by weight of the total fuel requirement of the process.

14. A process according to claim 4 wherein the endothermic change includes decarbonation in said second zone which is a preheater for said material in advance of said rotary kiln.

15. In a process of making Portland cement clinker which comprises continuously passing Portland cement raw feed mix through a first region in which endothermic change is effected in the raw feed mix and then through a sintering zone while applying sufficient heat to the process to recover Portland cement clinker, the improvement which comprises:
   a. physically separating the first region from the sintering zone;
   b. firing fuel along with combustion air in said sintering zone to generate heat at a first rate and temperature sufficient substantially completely to sinter the decarbonated mix therein and recover said clinker only when the mix received from said first region is substantially completely decarbonated;
   c. passing the effluent gas from step (b) directly into said first region to provide sufficient heat as only partially effects decarbonation of the feed mix within said first region;
   d. extracting heat from the hot recovered clinker by flowing air to recover cooled clinker and heated effluent air;
   e. firing fuel separately from step (b) in the heated effluent air of step (d) to generate heat at a second rate which is much greater than said first rate;
   f. applying the heat generated in step (e) to said decarbonation zone and to a boiler, said second rate being sufficient substantially completely to decarbonate said mix in the decarbonation zone and to generate steam from the boiler; and
   e. employing steam generated by the boiler for the generation of power.

16. In a process as defined in claim 15 wherein all of the fuel of step (e) is fired in the boiler.

17. In a process as defined in claim 15 wherein the majority of fuel fired in step (e) is fired in said decarbonation zone and a minor amount is fired in said boiler.

* * * * *